US010592348B2

(12) United States Patent
Pogosyan et al.

(10) Patent No.: US 10,592,348 B2
(45) Date of Patent: Mar. 17, 2020

(54) SYSTEM AND METHOD FOR DATA DEDUPLICATION USING LOG-STRUCTURED MERGE TREES

(71) Applicant: Acronis International GmbH, Schaffhausen (CH)

(72) Inventors: Vitaly Pogosyan, Moscow (RU); Kirill Korotaev, Moscow (RU); Serguei Beloussov, Costa Del Sol (SG); Stanislav Protasov, Moscow (RU); Mark Shmulevich, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 246 days.

(21) Appl. No.: 15/624,796

(22) Filed: Jun. 16, 2017

(65) Prior Publication Data

US 2017/0364414 A1 Dec. 21, 2017

Related U.S. Application Data

(60) Provisional application No. 62/351,388, filed on Jun. 17, 2016.

(51) Int. Cl.
*G06F 11/14* (2006.01)
*G06F 16/901* (2019.01)
*G06F 16/174* (2019.01)

(52) U.S. Cl.
CPC ...... *G06F 11/1453* (2013.01); *G06F 16/1748* (2019.01); *G06F 16/9027* (2019.01); *G06F 2201/84* (2013.01)

(58) Field of Classification Search
CPC ............ G06F 11/1453; G06F 16/1748; G06F 16/9027; G06F 2201/84
See application file for complete search history.

(56) References Cited

U.S. PATENT DOCUMENTS

| 8,463,742 | B1* | 6/2013 | Floyd | G06F 16/1748 707/609 |
| 9,639,577 | B1* | 5/2017 | Lai | G06F 16/2455 |
| 2011/0066628 | A1* | 3/2011 | Jayaraman | G06F 16/1748 707/758 |
| 2015/0127621 | A1* | 5/2015 | Kuo | G06F 3/061 707/692 |
| 2016/0154839 | A1* | 6/2016 | Bezawada | G06F 16/2365 707/692 |

* cited by examiner

*Primary Examiner* — Robert W Beausoliel, Jr.
*Assistant Examiner* — Mohammad Solaiman Bhuyan
(74) *Attorney, Agent, or Firm* — Arent Fox LLP; Michael Fainberg

(57) ABSTRACT

Disclosed are systems, methods and computer program products for data deduplication during a backup using at least two LSM trees. An example method includes calculating, for a first data block, a first hash value associated with the first data block and determining a reduced hash value based on the first hash value. The method includes determining whether the first data block contains data duplicative of an existing data block in a prior backup based on whether the reduced hash value occurs in a first log-structured merge (LSM) tree. If so, the method includes comparing the first hash value to one or more hash values in a second LSM tree to identify a matching hash value, and writing a first segment identifier (ID) corresponding to the matching hash value in an archive, the first segment ID referencing the existing data block in a segment store.

21 Claims, 5 Drawing Sheets

SYSTEM AND METHOD FOR DATA DEDUPLICATION USING LOG-STRUCTURED MERGE TREES

CROSS-REFERENCE TO RELATED APPLICATIONS

This application claims the benefit of U.S. Provisional Application No. 62/351,388, filed Jun. 17, 2016, which is herein incorporated by reference in its entirety.

TECHNICAL FIELD

The disclosure relates generally to the field of data backup, and more specifically to the systems and methods for data deduplication during a backup using at least two log-structured merge trees.

BACKGROUND

Modern corporate enterprises have large volumes of critical data, such as work documents, emails, financial records, etc., that requires backup and recovery to prevent data loss. During backup procedure, data stored on client workstations and servers is sent to a backup storage. During recovery procedure, backup data is retrieved from the backup storage and reconstructed on client workstations and servers. Since the amount of data that requires backup can be very large, which even for a medium-sized company can be measured in hundreds of terabytes, the backup process can be very resource intensive and time consuming. Furthermore, provided that data backup has to be performed frequently, e.g., daily, semi-weekly, the backup process can be quite onerous on the corporate network.

For efficiency, various backup systems may employ data deduplication. Data deduplication refers to a data compression technique that offers a reduction in the amount of data by eliminating duplicate copies of repeating data (e.g., a same bit sequence or byte sequence). For deduplication, unique blocks of data are identified and stored. As new blocks arrive, the backup system determines if the new block matches a stored block. If the new block does match a stored block, a reference (e.g., pointer) is stored for the new block that indicates the data is available at the stored block. If the new block does not match a stored block, the new block is stored so that further blocks may be compared against it.

In some aspects, a block may be associated with an identifier, and identifiers may be indexed. Different approaches to indexing may be employed to determine whether a new block matches a stored block. However, the process of determining whether a new block matches a stored block incurs overhead (e.g., time, system resources, etc.), in particular when a search is performed on disk instead of in volatile memory.

Therefore, there exists a need to reduce the overhead (e.g., time, system resources, etc.) associated with searching for existing blocks and adding new blocks.

SUMMARY

Disclosed are systems, methods and computer program products for data deduplication during a backup using at least two log-structured merge (LSM) trees in order to reduce overhead (e.g., time, system resources, etc.) associated with adding new data to an index and searching to identify existing data blocks. In one exemplary aspect, the backup system calculates, for a first data block, a first hash value associated with the first data block. The system may determine a reduced hash value based on the first hash value, wherein the reduced hash value is smaller in size than the first hash value. The system may then determine whether the first data block contains data duplicative of an existing data block in a prior backup based on whether the reduced hash value occurs in a first log-structured merge (LSM) tree. The first LSM tree may be stored in volatile memory. Responsive to determining that the reduced hash value occurs in the first LSM tree, the system compares the first hash value to one or more hash values in a second LSM tree to identify a matching hash value, and writes a first segment identifier (ID) corresponding to the matching hash value in an archive, the first segment ID referencing the existing data block in a segment store.

According to another aspect, comparing the first hash value to one or more hash values in a second LSM tree to identify a matching hash value may further include retrieving a plurality of segment IDs including the first segment ID from the first LSM tree based on the reduced hash value. The described techniques include retrieving a plurality of records from the second LSM tree associated with the plurality of segment IDs, wherein the plurality of records contains the hash values of existing data blocks and a corresponding physical offset, and determining the first segment ID from a first record from the plurality of records that contains the matching hash value.

According to another aspect, the described technique includes, responsive to determining that the reduced hash value does not occur in the first LSM tree, storing, in the segment store, the first data block, determining a physical offset associated with the stored first data block, adding a first record to the second LSM tree, wherein the first record indicates a mapping from the segment ID to the first hash value and the physical offset, and adding a second record to the first LSM tree, wherein the second record indicates a mapping from the reduced hash value to the segment ID.

According to another aspect, the described technique includes generating the segment ID by incrementing a previous segment ID.

According to another aspect, determining a reduced hash value based on the first hash value includes selecting a plurality of bits beginning the first hash value as the reduced hash value.

According to another aspect, wherein the second LSM tree contains records mapping segment IDs to hash values of existing data blocks and the corresponding physical offset in the segment store, and the first LSM tree contains records mapping reduced hash values to the segment IDs.

According to another aspect, wherein comparing the first hash value to the one or more hash values in the second LSM tree to identify the matching hash value further includes searching tree structures of the second LSM tree that reside in memory and refraining from searching tree structures of the second LSM tree that reside in persistent storage.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects of the present invention are described herein in the context of systems, methods and computer program products for data deduplication during a backup procedure using at least two log-structured merge trees. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same items.

Figure 1:
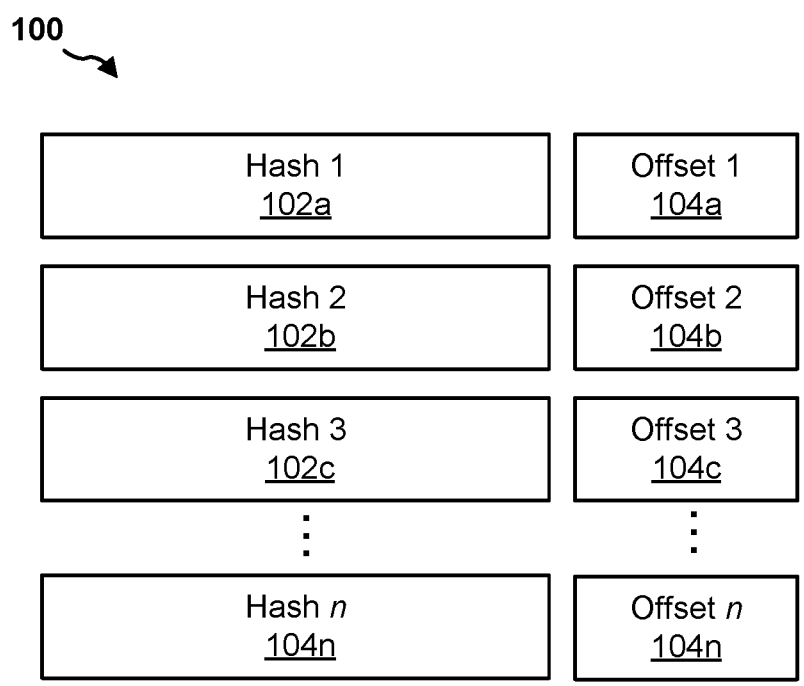
FIG. 1 is a diagram illustrating an exemplary index table associated with data deduplication.

FIG. 1 depicts an index table 100 associated with data deduplication. Data deduplication during a data backup is generally based on the approach that repeated data elements are not stored in storage or archived storage twice. Rather, each re-use of the data element is replaced by a reference to the already available element (e.g., block, data chunk, etc.). Typically, a hash of the data block may be used to identify the data block and the address of the location of the block in storage (referred to as an offset). To quickly locate the correct offset, different methods of indexing may be used, such as index table 100, which map the addresses (offsets) of data blocks to their hashes.

As shown in FIG. 1, the index table 100 includes a plurality of entries corresponding to a plurality of data blocks (or chunks). Each entry includes a hash value 102 (e.g., 102a, 102b, 102c, . . . 102n) and an associated offset value 104 (104a, 104b, 104c, . . . 104n).

A backup system may scan data to be backed up and divide that data into blocks, in a processes known as chunking. The backup system may then calculate a hash 102 for each data block. The backup system may check a new hash against the indexed hashes 102 to determine if a new data block is unique. If the new data block is unique, the new hash is added to the indexed hashes 102. Further, the backup system adds the new data block to storage and determines an offset of the new data block in the storage (e.g., an offset from a beginning address of an archive file). If the hash is not unique (an existing hash has been found in the table 100), the backup system makes a link to the existing data offset and refrains from putting the new data block into the backup archive. As such, two or more hashes 102 can have the same data block offset 104. The index table 100 may increase in size as new data blocks are added to the index by the backup system.

One known drawback to conventional approaches for data deduplication using index tables is that the size of the elements in an index table may become too large. For example, assuming the backup system uses a SHA1 method to calculate a hash 102, and the offset is at least 8 bytes, an entry in the index table may be 28 bytes (20+8 bytes). If the backup system uses a SHA256 method to calculate the hash, each entry is even larger, at least 40 bytes (32+8 bytes). These entry sizes can prevent all the components of the index table from being held in memory (RAM). Portions of the index table have to be periodically written to disk (hard disk drive), thereby resulting in significant performance costs and latencies.

A log-structured merge-tree (LSM tree) is a data structure that includes at least two tree-like structures, or levels (e.g., $C_0$ and $C_1$). New records may be inserted into a first level (e.g., $C_0$) and when insertion causes that first level to exceed a threshold, one or more records may be moved from the first level to a second level (e.g., $C_1$), in a "merge" process. Other versions of the LSM tree may include multiple levels, i.e., more than two levels. An LSM tree may be used as an index for data storage and backup, particularly in the context of data deduplication. A single LSM tree may offer quick addition of new data, but may not offer a quick search for existing data, compared to other types of search tree data structures.

In some approaches, the index table 100 may be part of an LSM tree used for indexing data blocks. However, even if an LSM tree scheme for indexing is applied, this might help for fast data insertion, but would not resolve the above-described drawbacks. When the backup system attempts to find entries inside the index, the backup system would operate slowly because conventional LSM trees are generally optimized to write new data quickly, but not to search them.

According to certain aspects of the present disclosure, a backup system as described herein may employ at least two sets of LSM trees, each of which may include an index table similar to index table 100, during a data backup process for data deduplication. The described scheme of using at least two LSM trees maintains the advantage of quick additions of new data and, additionally, reduces the time spent searching for data that is already archived compared to conventional techniques. Such an approach may reduce the time consumed by a deduplication process during backup, for example, by reducing the number of read and/or write operations on disk. The described system allows for quick search in the index, while at the same time, still allowing quick inserts into the (second) index and ensuring data locality of the index. To do so, at least one of the LSM trees may be stored in volatile memory (e.g., random-access memory) to reduce the time consumed by searching the index. Further, sequential identifiers may be assigned to adjacent data blocks (i.e., data locality), which reduces the number of random disk accesses in the search for a matching data block.

A first index T1 may be implemented by a LSM tree having records of a reduced size compared to conventional indexing methods. As described in greater detail below, this first index T1 may map reduced hashes of a data block to some logical offset value referred to herein as segment identifiers. In one aspect, the reduced hashes and segment identifiers may be derived from the full hash values and physical offset values, respectively. A second index T2 may be implemented by another LSM tree that provides a mapping between the segment identifiers and the full hash values and "physical" offsets (i.e., the address of the location of the data blocks in storage).

Figure 2:
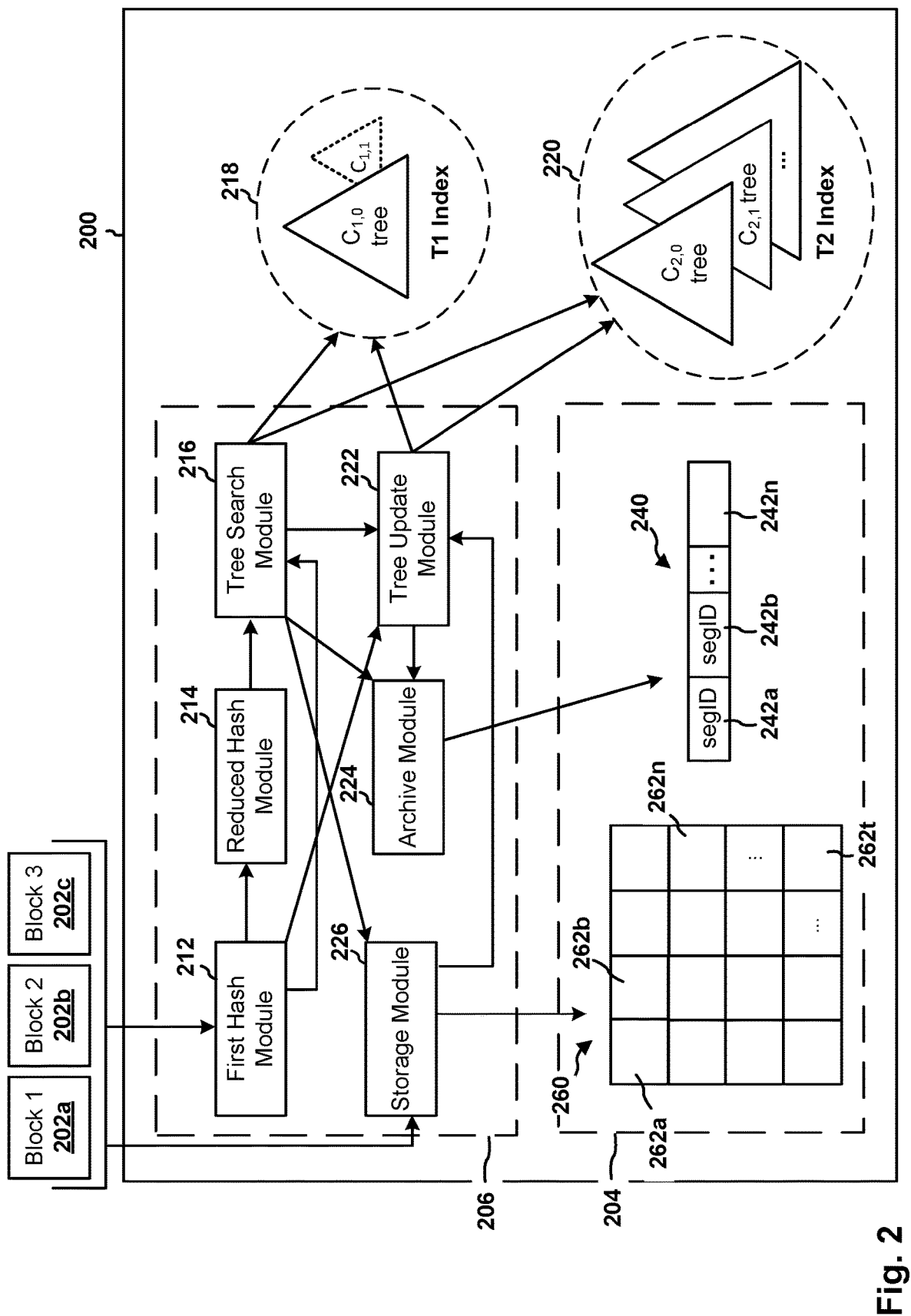
FIG. 2 is a diagram illustrating an exemplary system for data deduplication during a backup using at least two LSM trees according to an exemplary aspect.

FIG. 2 depicts a diagram of an exemplary system 200 for data deduplication during a backup using at least two LSM trees according to an exemplary aspect. It will be appreciated that while FIG. 2 illustrates a plurality of components, additional components may be included and/or illustrated components may be omitted or combined. Further, connections between various components are intended to be illustrative and different approaches to communication between components may be employed in the system 200. While the system 200 is described in the context of a backup operation, other implementations are comprehended herein (e.g., data caching using the system 200 may increase the speed of working with data).

The backup system 200 includes multiple types of memory and storage mediums having different performance characteristics (e.g., access speed, latency, cost, etc.) As shown, the backup system 200 may include volatile memory 206, which may be random-access memory (RAM). The backup system also includes persistent storage 204, which may include one or more hard disk drives (HDD), non-volatile memory (flash memory), magnetic tapes, and other suitable storage medium.

The backup system 200 may further include a segment store 260, which may store a plurality of data blocks 262 in persistent storage 204. The backup system 200 may further include an archive 240 configured to track re-use of data elements in the segment store 260. The archive 240 may contain references to the original copies of data blocks in the segment store 260. The archive 240 may include a plurality of segment identifiers (IDs) 242. Each segment ID 242 may be a reference to a data block 262 in the segment store 260 (e.g., segment ID 242a may reference block 262a). The archive 240 may be stored in persistent storage 204 (although not necessarily the same persistent storage as the segment store 260), such as on disk.

The volatile memory 206 may include at least a first LSM tree 218, which may be associated with an index for blocks 262 in the store 260. The system 200 may further include a second LSM tree 220, which also may be associated with an index for blocks 262 in the store 260. In aspects, the first LSM tree 218 may be mostly or substantially entirely stored in volatile memory 206. In some cases, a portion of the first LSM tree 218 (such as a second level $C_{1,1}$ tree structure) can reside in persistent storage 204. In aspects, the second LSM tree 220 may be stored in persistent storage 204, volatile memory 206, or a combination thereof. In an aspect, the second LSM tree 220 may include a plurality of records, and each record may indicate a mapping from a segment ID 242 to a first hash value and a physical offset (e.g., an offset from a beginning address of a file in the segment store 260 or an offset from a first data block 262a in the segment store 260). Similarly, the first LSM tree 218 may include a plurality of records. However, each record in the first LSM tree may indicate a mapping from a reduced hash value to a segment ID 242, and each reduced hash value may be determined from a first hash value in the second LSM tree 220.

In one aspect, the size of records in the first index T1 (as well as the LSM tree threshold size) are selected such that most or substantially all of the first index T1 is able to reside in volatile memory 206 (RAM). It is understood that each LSM tree 218, 220 itself may contain multiple tree-like structures. For example, the first index T1 might have a first level $C_{1,0}$ tree, and a second level $C_{1,1}$ tree on disk that merges entries from the first level if need be. In certain aspects, the records of the index T1 are sized such that the entirety of the LSM tree 218 (i.e., essentially first level $C_{1,0}$) can remain in RAM.

For example, a reduced hash could be taken from the first 5 bytes of the full hash value of the block of data, and the segment identifier, which is a truncated physical address of the data block, could be the last 4 bytes of the full physical offset value. The size of each records (9 bytes) stored in the first index T1 is significantly smaller than conventional indexes (such as the 28-40 bytes in the index described in conjunction with FIG. 1). Because of this, most or all of the index table T1 can always be placed in memory (in first level $C_{1,0}$), without needing to transfer it to the slower disk storage (in a second level $C_{1,1}$). Since the size of each record is significantly reduced, the entire table needed for a typical volume of backup data can fit into a typical size of RAM memory.

In aspects, the system 200 includes a plurality of modules 212, 214, 216, 222, 224, 226. Although the plurality of modules 212, 214, 216, 222, 224, 226 are illustrated as within volatile memory 206, one or more of the modules 212, 214, 216, 222, 224, 226 may be implemented as hardware, software, or a combination (e.g., system on a chip) and may be persistently stored.

As shown in FIG. 2, a plurality of blocks 202 are provided to the system 200, for example, in association with a backup operation. In an aspect, the system 200 may not receive data already divided into blocks 202; rather, the system 200 may receive data to be stored and the system 200 may segment the data into a plurality of blocks 202 (e.g., "chunking"). In an aspect, the first hash module 212 receives a first block 202a. The first hash module 212 may be configured to calculate a first hash value associated with the first data block 202a. For example, the first hash module 212 may use a SHA1 or SHA256 method to calculate a hash based on a byte pattern of the first block 202a. In other examples, the first hash module 212 may be configured to perform any suitable fingerprinting algorithm that translates the data of the first block 202a into a shorter value, or fingerprint, that uniquely identifies the first block 202a. The first hash module 212 may provide the first hash value to a reduced hash module 214.

The reduced hash module 214 may be configured to determine a reduced hash value based on the first hash value. The reduced hash value may be smaller in size than the first hash value. In an aspect, the reduced hash module 214 may select a plurality of bits (e.g., 5 bytes) beginning the first hash value as the reduced hash value. In some aspects, the reduced hash module 214 may generate a reduced hash value by taking a predetermined portion of the first hash value (e.g., the first N bytes, the last N bytes, etc.) The reduced hash module 214 may provide the reduced hash value to a tree search module 216.

The tree search module 216 may be configured to search the first LSM tree 218 and the second LSM tree 220. With the reduced hash value, the tree search module 216 may determine whether the reduced hash value occurs in the first LSM tree 218 (e.g., determine whether the reduced hash value matches a value in an index table of the first LSM tree 218). In an aspect, the reduced hash value may occur a plurality of times in the first LSM tree 218. As the first LSM tree 218 indicates mappings between reduced hash values and segment IDs 242, the tree search module 216 may identify one or more segment IDs, each of which corresponds to a value in the first LSM tree 218 that matches the reduced hash value. In one aspect, the tree search module 216 obtains all segment IDs for each reduced hash value found in the first LSM tree 218.

When the reduced hash value does occur in the first LSM tree 218, the tree search module 216 may then search the second LSM tree 220 for records that match the segment IDs (obtained from the first LSM tree 218). In an aspect, the tree search module 216 may use the one or more segment IDs identified from the first LSM tree 218 to select one or more full hash values in the second LSM tree 220. The tree search module 216 may compare the first hash value to the one or more selected full hash values to identify the one that matches with the newly received data block 202a.

From the matching hash value, the tree search module 216 may identify a record indicating a mapping from segment ID to the first hash value and the physical offset. The tree search module 216 may provide this information to an archive module 224. For the first data block 202a, the archive module 224 may write, in the archive 240, the segment ID corresponding to the matching hash value. For example, the archive module 224 may write the second segment ID 242b in the archive 240 as a reference to an existing data block (e.g., data block 262b), which is located in the segment store 260. In some aspects, the first data block 202a may be referenced by a pointer that indicates the first data block 202a corresponds to the segment ID 242b referencing the existing data block 262b in the segment store 260.

When the reduced hash value does not occur in the first LSM tree 218, the tree search module 216 may indicate to a storage module 226 that the first data block 202a is unique (i.e., not previous encountered) and therefore should be added to the segment store 260. The storage module 226 may record the first data block 202a into the segment store 260. For example, the first block 202a may be written as block 262t in the segment store 260. Based on the newly added block 262t, the storage module 226 may determine an offset for the newly added block 262t, such as an offset from a beginning physical address of the block 262t in the segment store 260 or an offset from a beginning block 262a in the segment store 260. The storage module 226 may provide this offset to a tree update module 222.

The tree update module 222 may add a record to the second LSM tree 220 that contains the first hash value (of the newly received data block 202a) and the received offset. The tree update module 222 may assign this new record a segment ID by adding the next sequential number. For example, the tree update module 222 may generate a segment ID in association with the newly added block 262t. In aspects, the tree update module 222 may generate a segment added for the newly added block 262t by incrementing a previous segment ID (e.g., the segment ID of a unique data block 262n added to the segment store 260 immediately before the newly added block 262t). In some aspects, the tree update module 222 may add a record to the second LSM tree 220 that indicates a mapping from the segment ID to the first hash value and the physical offset.

After this, the tree update module 222 may add a record to the first LSM tree 218, where the segment ID for this data block corresponds to the reduced hash value (determined earlier by the reduced hash module 214. In an aspect, the tree update module 222 may add a record to the first LSM tree 218 that indicates a mapping from the reduced hash value to the segment ID. Accordingly, the tree search module 216 may quickly search to determine whether a next block 202b matches the newly added block 262t. A similar process as described with respect to first block 202a may then be repeated for all remaining blocks received during backup operation (e.g., at least remaining blocks 202b, 202c).

According to aspects of the present disclosure, the segment IDs (i.e., logical offsets) follow in the same order in which new data blocks were added during the backup operation. Thus, the segment IDs may be sequential and may reflect the order in which blocks 202 are added during backup. When reading large files (e.g., video data), which can consist of hundreds or even thousands of segments, the described system significantly reduces the time required to identify duplicate data because of data locality. By introducing a segment ID as a logical offset, all adjacent data blocks will have sequential segment IDs. For example, adjacent blocks 262a and block 262b may have sequential segment IDs (e.g., segment ID 242a and segment ID 242b). Thus, in the process of de-duplication, by finding the first block of data already recorded in the archive 240, the described system can quickly compare them with the new incoming data within one disk read cycle of the persistent storage 204, rather than reading each block using separate read (and write) operations.

Figure 3:
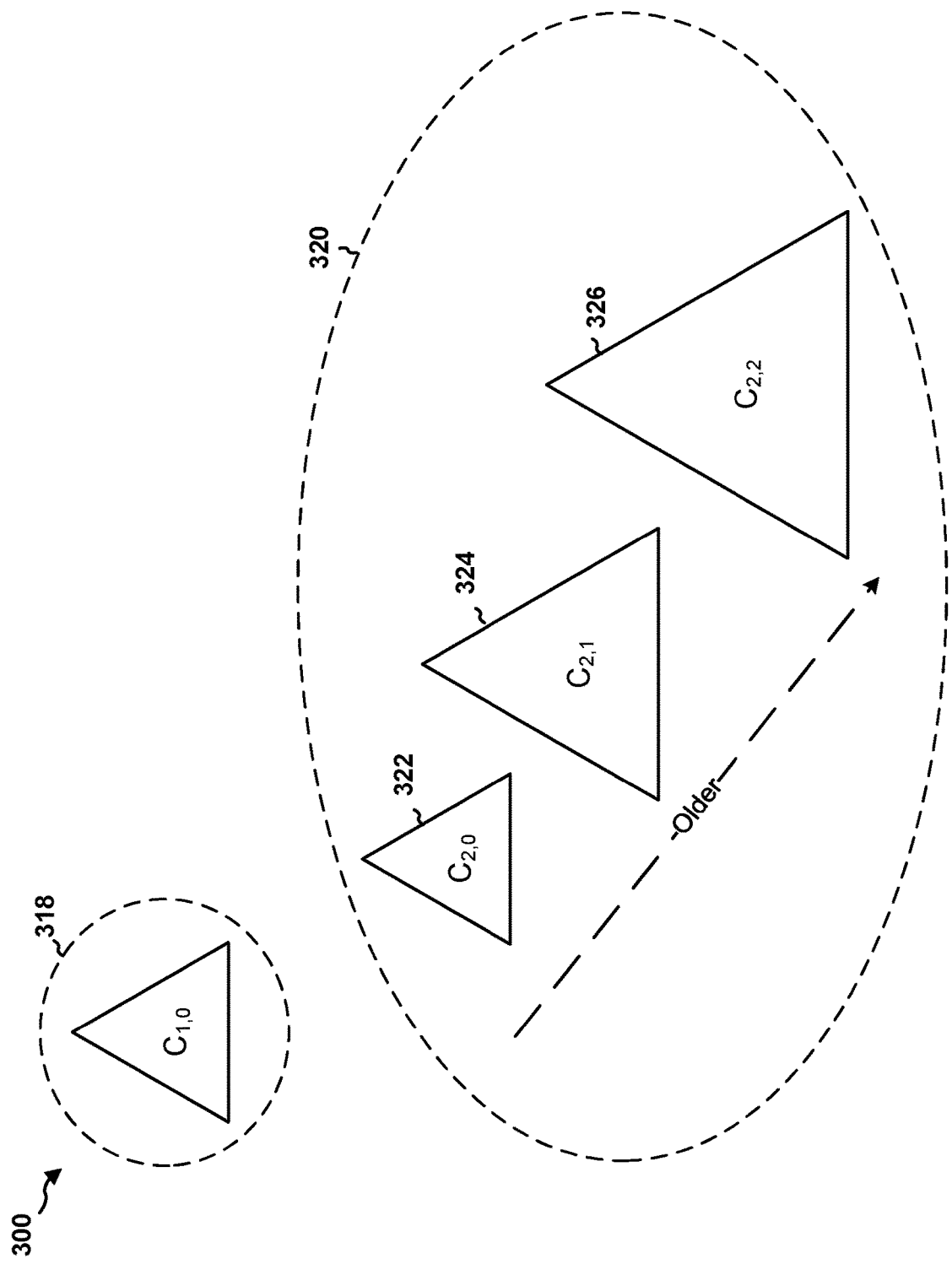
FIG. 3 is a diagram illustrating exemplary LSM trees associated with data deduplication according to an exemplary aspect.

FIG. 3 is a diagram 300 of a plurality of LSM trees 318, 320 associated with data deduplication. The LSM trees 318, 320 may be configured similar to the LSM trees 218, 220 described above. The LSM trees 318, 320 have the property of "displacement" of older data to derived trees of the lower level (e.g., $C_0$, $C_1$, $C_2$, . . . ). That is, when a threshold is reached, older records from one level of an LSM tree are moved to a lower level of the LSM tree. For example, the second LSM tree 320 (associated with the full index T2) may be comprised of three tree-like structures 322, 324, 326 corresponding to respective levels $C_{2,0}$, $C_{2,1}$, $C_{2,2}$. Tree structure 322 associated with level $C_{2,0}$ may be placed in memory while the other tree structures 324, 326 are stored in disk storage. When a threshold amount of records is reached in level $C_{2,0}$ 322, one or more older records may be moved to the next level $C_{2,1}$ 324 of the LSM tree 320. In aspects, this threshold, as well as other coefficients associated with the deduplication process may be adjusted to increase efficiency.

According to one aspect of the present disclosure, the described system may adjust the "coefficient" or deduplication efficiency by changing the search behavior on a LSM tree 318, 320. In an aspect, the described system may search only those tree structures that are stored in RAM and refrain from searching those records that already displaced into the lower tree structures, and thus into the slower disk storage. For example, the described system may search only in the trees 322, 324 corresponding to levels $C_{2,0}$ and $C_{2,1}$ (that are placed in volatile memory 206) and ignore records that are in the tree 326 corresponding to level $C_{2,2}$ (that is placed in persistent storage 204). As a result, an earlier-stored data block in the tree 326 might not be discovered by the deduplication search, and a data block containing duplicate data might be inserted into the higher trees 322, 324. This modified search behavior adjusts the deduplication efficiency because the LSM trees 318, 320 track, say, 98% unique data rather than 100% unique data. Nevertheless, in some cases, the search behavior of the described system may be configured such that the benefit of this modified search behavior having a shortened search and quick record insertion—reduced time and resources—may outweigh the increase in storage space for some duplicate data elements.

Aspects described herein may be used in combination with bloom filters and related algorithms to improve search indexes on tables (e.g., lookup tables). For example, the described system 200 may further include one or more bloom filter data structures configured to test whether a certain reduced hash is found within the first LSM tree 218, or whether a segment ID is found within the second LSM tree 320. Further, aspects described herein may be configured to perform data compacting to optimize compact data placement in storage and use stream binning technology. For example, the described system 200 may be configured to perform data compacting on tree structures of the second LSM tree 220 to improve data placement in persistent storage 204.

Figure 4:
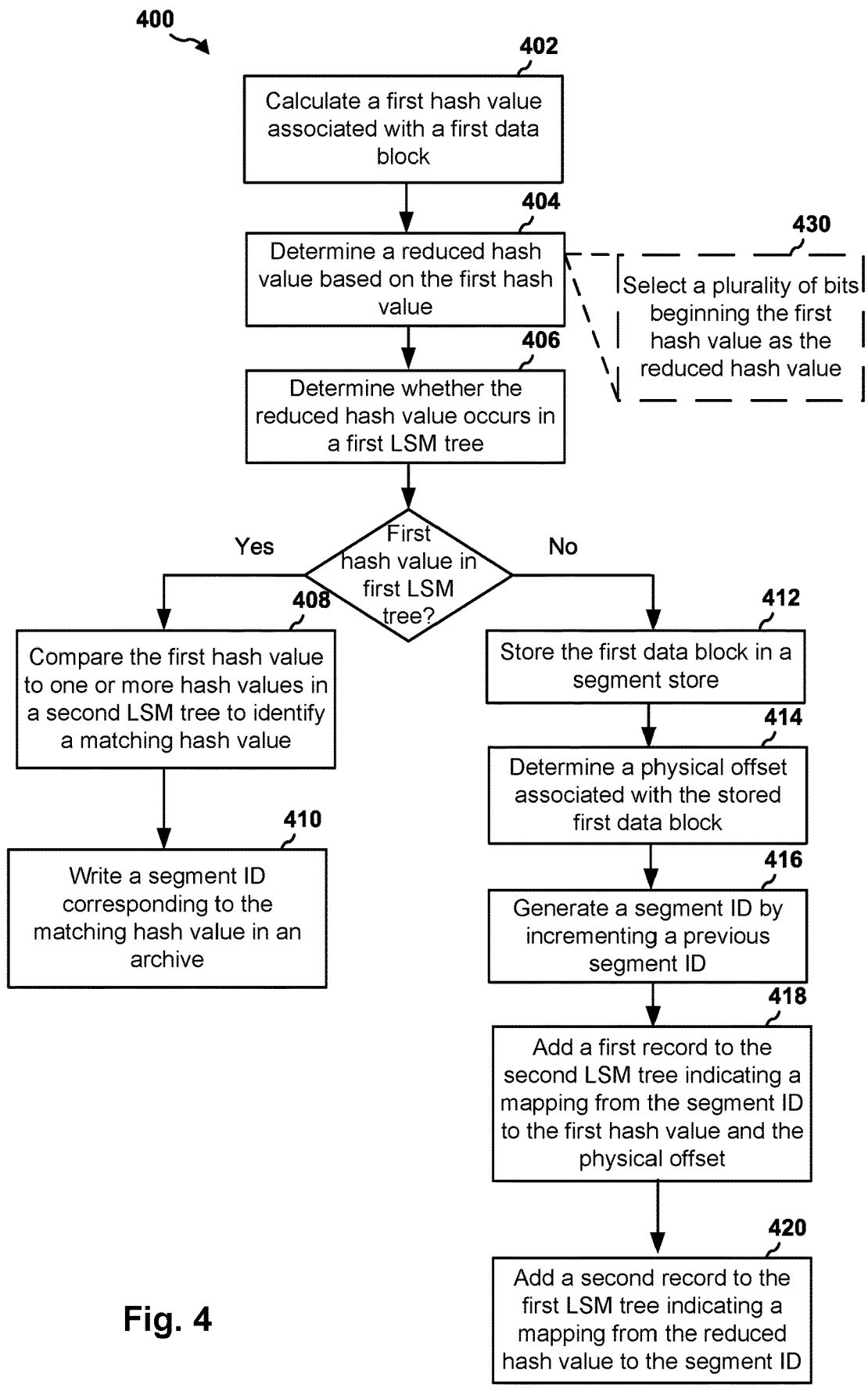
FIG. 4 is a flow diagram illustrating an exemplary method for data deduplication during a backup using at least two LSM trees according to an exemplary aspect.

FIG. 4 depicts an exemplary method for data deduplication during a backup using at least two LSM trees. The method 400 may be implemented by the system 200 shown in FIG. 2. It will be understood that one or more operations may be omitted and/or contemporaneously performed.

At operation 402, the system 200 calculates a first hash value associated with a first data block. For example, the first hash module 212 may calculate a first hash value for the first data block 202a.

At operation 404, the system 200 determines a reduced hash value based on the first hash value. The reduced hash value may be smaller in size than the first hash value. For example, the reduced hash module 214 may calculate a reduced hash value based on the first hash value from the first hash module 212. In some aspects, the reduced hash module 214 may generate the reduced hash value by truncating the existing first hash value, such as using the first 5 bytes of the (full) first hash value. In an aspect, operation 404 includes operation 430. At operation 430, the system 200 selects a plurality of bits beginning the first hash value as the reduced hash value.

At operation 406, the system 200 determines whether the first data block contains data duplicative of an existing data block in a prior backup based on whether the first hash value occurs in a first LSM tree 218. For example, the tree search module 216 may search the first LSM tree 218 to determine whether any values therein match the reduced hash value. In certain aspects, the first LSM tree 218 contains records mapping reduced hash values to the segment IDs. In some aspects, the first LSM tree may be in volatile memory 206 of the system 200. In some aspects, the first LSM tree is sized such that all or substantially all of the records in the first LSM tree reside in memory without being displaced to a lower level tree structure in persistent storage.

Responsive to determining that the reduced hash value occurs in the first LSM tree 218, the method 400 may proceed to operation 408. At operation 408, the system 200 may compare the first hash value to one or more hash values in a second LSM tree to identify a matching hash value. In certain aspects, the second LSM tree 220 contains records mapping segment IDs to hash values of existing data blocks 262 and the corresponding physical offset in the segment store 260.

In some aspects, the system 200 retrieves a plurality of segment IDs from the first LSM tree based on the reduced hash value. The system 200 then retrieves a plurality of records from the second LSM tree associated with the plurality of segment IDs. The plurality of records contains the hash values of existing data blocks and a corresponding physical offset. The system may determine a (first) segment ID from a first record from the plurality of records that contains the matching hash value.

In some aspects, the tree search module 216 may search tree structures of the second LSM tree that reside in memory and refrain from searching tree structures of the second LSM tree that reside in persistent storage. For example, the tree search module 216 may retrieve the plurality of records associated with the segment IDs from the tree structures 322, 324 of the second LSM tree 320 that reside in volatile memory 206. The tree search module 216 may refrain from searching the tree structure 326 of the second LSM tree 320 that is on disk for segment IDs.

In another aspect, the tree search module 216 may compare the first hash value to one or more hash values in the second LSM tree 220. In an aspect, the system 200 may determine one or more segments IDs from the first LSM tree 218—each segment ID may correspond to a value that matches the reduced hash value. When comparing the first hash value to the one or more hash values in the second LSM tree, the system 200 may only compare the first hash value to hash values associated with segment IDs matching the one or more segment IDs determined from the first LSM tree 218.

At operation 410, the system 200 may write the first segment ID corresponding to the matching hash value in an archive. For example, the archive module 224 may write a segment ID 242b in the archive 240, and the segment ID 242b may corresponding to an existing data block 262b.

Responsive to determining that the reduced hash value does not occur in the first LSM tree, the system 200 may conclude that the first data block is unique (i.e., not found in prior backups) and proceed to operation 412. At operation 412, the system 200 may store the first data block in a segment store. For example, the storage module 226 may store the first data block 202a in the segment store 260 (e.g., as block 262t). At operation 414, the system 200 may determine a physical offset associated with the stored data block. For example, the storage module 226 may determine a physical offset of the newly added data block 262t.

At operation 416, the system may generate a segment ID by incrementing a previous segment ID. For example, the tree update module 222 may increment a previous segment ID to obtain a new segment ID. At operation 418, the system 200 may add a first record to the second LSM tree, and the first record may indicate a mapping from the segment ID to the first hash value and the physical offset. For example, the tree update module 222 may add a record to the second LSM tree 220 that indicates a mapping from the segment ID to the first hash value and the physical offset. At operation 420, the system 200 may add a second record to the first LSM tree, and the second record may indicate a mapping from the reduced hash value to the segment ID. For example, the tree update module 222 may add a record to the first LSM tree 218 that indicates a mapping from the reduced hash value to the segment ID.

Figure 5:
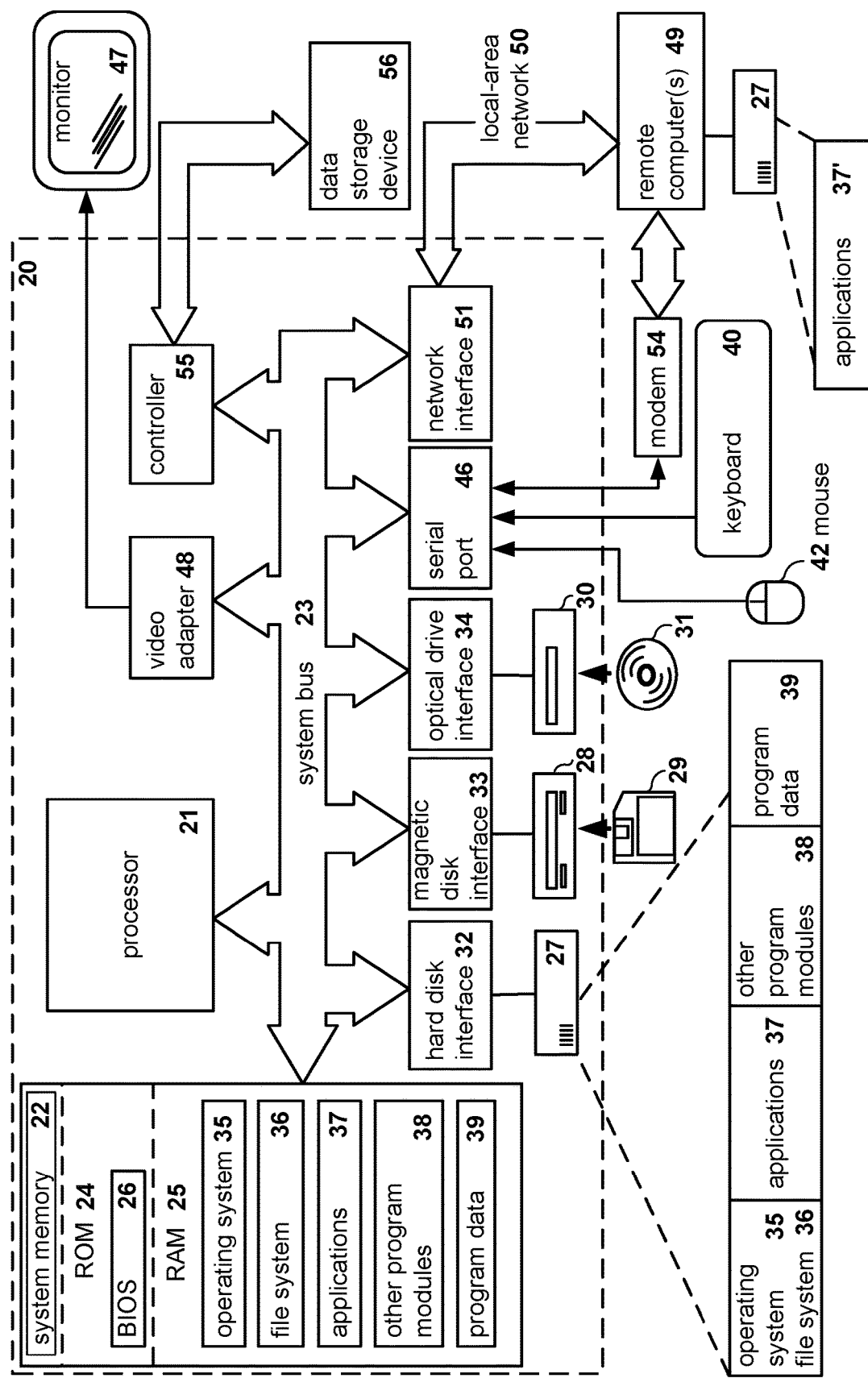
FIG. 5 is a block diagram of a general-purpose computer system on which the disclosed system and method can be implemented according to an exemplary aspect.

FIG. 5 is a block diagram illustrating a general-purpose computer system 20 on which aspects of systems and methods for scanning web pages may be implemented in accordance with an exemplary aspect. It should be noted that the computer system 20 can correspond to the system 200, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for performing data deduplication during a backup procedure, the method comprising:
   calculating, for a first data block, a first hash value associated with the first data block;
   determining a reduced hash value based on the first hash value, wherein the reduced hash value is smaller in size than the first hash value;
   determining whether the first data block contains data duplicative of an existing data block in a prior backup based on whether the reduced hash value occurs in a first log-structured merge (LSM) tree, the first LSM tree stored in volatile memory; and
   responsive to determining that the reduced hash value occurs in the first LSM tree:
      comparing the first hash value to one or more hash values in a second LSM tree to identify a matching hash value; and
      writing a first segment identifier (ID) corresponding to the matching hash value in an archive, the first segment ID referencing the existing data block in a segment store.

2. The method of claim 1, wherein comparing the first hash value to one or more hash values in a second LSM tree to identify a matching hash value further comprises:
   retrieving a plurality of segment IDs including the first segment ID from the first LSM tree based on the reduced hash value;
   retrieving a plurality of records from the second LSM tree associated with the plurality of segment IDs, wherein the plurality of records contains the hash values of existing data blocks and a corresponding physical offset; and
   determining the first segment ID from a first record from the plurality of records that contains the matching hash value.

3. The method of claim 1, further comprising:
   responsive to determining that the reduced hash value does not occur in the first LSM tree:
      storing, in the segment store, the first data block;
      determining a physical offset associated with the stored first data block;
      adding a first record to the second LSM tree, wherein the first record indicates a mapping from the segment ID to the first hash value and the physical offset; and
      adding a second record to the first LSM tree, wherein the second record indicates a mapping from the reduced hash value to the segment ID.

4. The method of claim 3, further comprising:
   generating the segment ID by incrementing a previous segment ID.

5. The method of claim 1, wherein determining a reduced hash value based on the first hash value comprises:
   selecting a plurality of bits beginning the first hash value as the reduced hash value.

6. The method of claim 1, wherein the second LSM tree contains records mapping segment IDs to hash values of existing data blocks and the corresponding physical offset in the segment store, and the first LSM tree contains records mapping reduced hash values to the segment IDs.

7. The method of claim 1, wherein comparing the first hash value to the one or more hash values in the second LSM tree to identify the matching hash value further comprises:
   searching tree structures of the second LSM tree that reside in memory and refraining from searching tree structures of the second LSM tree that reside in persistent storage.

8. A system for performing data deduplication during a backup procedure, the system comprising:
   a storage device having a segment store that includes a plurality of existing data blocks from prior backups;
   a memory storing a first log-structured merge (LSM) tree;
   at least one hardware processor configured to:
      calculate, for a first data block, a first hash value associated with the first data block;
      determine a reduced hash value based on the first hash value, wherein the reduced hash value is smaller in size than the first hash value;
      determine whether the first data block contains data duplicative of an existing data block based on whether the reduced hash value occurs in the first LSM tree; and
      responsive to determining that the reduced hash value occurs in the first LSM tree:
         compare the first hash value to one or more hash values in a second LSM tree to identify a matching hash value; and
         write a first segment identifier (ID) corresponding to the matching hash value in an archive, the first segment ID referencing the existing data block in the segment store.

9. The system of claim 8, wherein the processor configured to compare the first hash value to one or more hash values in a second LSM tree to identify a matching hash value is further configured to:
   retrieve a plurality of segment IDs including the first segment ID from the first LSM tree based on the reduced hash value;
   retrieve a plurality of records from the second LSM tree associated with the plurality of segment IDs, wherein the plurality of records contains the hash values of existing data blocks and a corresponding physical offset; and
   determine the first segment ID from a first record from the plurality of records that contains the matching hash value.

10. The system of claim 8, wherein the processor is further configured to:
    responsive to determining that the reduced hash value does not occur in the first LSM tree:
       store, in the segment store, the first data block;
       determine a physical offset associated with the stored first data block;
       add a first record to the second LSM tree, wherein the first record indicates a mapping from the segment ID to the first hash value and the physical offset; and
       add a second record to the first LSM tree, wherein the second record indicates a mapping from the reduced hash value to the segment ID.

11. The system of claim 8, wherein the processor is further configured to:
    generate the segment ID by incrementing a previous segment ID.

12. The system of claim 8, wherein the processor configured to determine a reduced hash value based on the first hash value is further configured to:
    select a plurality of bits beginning the first hash value as the reduced hash value.

13. The system of claim 8, wherein the second LSM tree contains records mapping segment IDs to hash values of existing data blocks and the corresponding physical offset in the segment store, and the first LSM tree contains records mapping reduced hash values to the segment IDs.

14. The system of claim 8, wherein the processor configured to compare the first hash value to the one or more hash values in the second LSM tree to identify the matching hash value is further configured to:
    search tree structures of the second LSM tree that reside in memory and refrain from searching tree structures of the second LSM tree that reside in persistent storage.

15. A non-transitory computer readable medium comprising computer executable instructions for performing data deduplication during a backup procedure, including instructions for:
    calculating, for a first data block, a first hash value associated with the first data block;
    determining a reduced hash value based on the first hash value, wherein the reduced hash value is smaller in size than the first hash value;
    determining whether the first data block contains data duplicative of an existing data block in a prior backup based on whether the reduced hash value occurs in a first log-structured merge (LSM) tree, the first LSM tree stored in volatile memory; and
    responsive to determining that the reduced hash value occurs in the first LSM tree:
        comparing the first hash value to one or more hash values in a second LSM tree to identify a matching hash value; and
        writing a first segment identifier (ID) corresponding to the matching hash value in an archive, the first segment ID referencing the existing data block in a segment store.

16. The non-transitory computer readable medium of claim 15, wherein the instructions for comparing the first hash value to one or more hash values in a second LSM tree to identify a matching hash value further comprises:
    retrieving a plurality of segment IDs including the first segment ID from the first LSM tree based on the reduced hash value;
    retrieving a plurality of records from the second LSM tree associated with the plurality of segment IDs, wherein the plurality of records contains the hash values of existing data blocks and a corresponding physical offset; and
    determining the first segment ID from a first record from the plurality of records that contains the matching hash value.

17. The non-transitory computer readable medium of claim 15, further comprising instructions for:
    responsive to determining that the reduced hash value does not occur in the first LSM tree:
        storing, in the segment store, the first data block;
        determining a physical offset associated with the stored first data block;
        adding a first record to the second LSM tree, wherein the first record indicates a mapping from the segment ID to the first hash value and the physical offset; and
        adding a second record to the first LSM tree, wherein the second record indicates a mapping from the reduced hash value to the segment ID.

18. The non-transitory computer readable medium of claim 17, further comprising instructions for:
    generating the segment ID by incrementing a previous segment ID.

19. The non-transitory computer readable medium of claim 15, wherein the instructions for determining a reduced hash value based on the first hash value comprises instructions for:
    selecting a plurality of bits beginning the first hash value as the reduced hash value.

20. The non-transitory computer readable medium of claim 15, wherein the second LSM tree contains records mapping segment IDs to hash values of existing data blocks and the corresponding physical offset in the segment store, and the first LSM tree contains records mapping reduced hash values to the segment IDs.

21. The non-transitory computer readable medium of claim 15, wherein the instructions for comparing the first hash value to the one or more hash values in the second LSM tree to identify the matching hash value further comprises instructions for:
    searching tree structures of the second LSM tree that reside in memory and refraining from searching tree structures of the second LSM tree that reside in persistent storage.

* * * * *